United States Patent [19]
Price

[11] Patent Number: 5,463,726
[45] Date of Patent: Oct. 31, 1995

[54] METHOD AND APPARATUS FOR GRAPHIC ACCESSING OF MULTIPLE SOFTWARE APPLICATIONS

[75] Inventor: Robert T. Price, Irving, Tex.

[73] Assignee: International Business Machines Corporation, Armonk, N.Y.

[21] Appl. No.: 301,154

[22] Filed: Sep. 6, 1994

Related U.S. Application Data

[63] Continuation of Ser. No. 616,151, Nov. 20, 1990, abandoned.

[51] Int. Cl.$^6$ .................................................. G06F 9/38
[52] U.S. Cl. ........................................ 395/155; 395/159
[58] Field of Search ................................. 395/155–161; 345/121, 123, 125

[56] References Cited

U.S. PATENT DOCUMENTS

| | | | |
|---|---|---|---|
| 4,962,475 | 10/1990 | Hernendez et al. | 395/157 |
| 4,974,173 | 11/1990 | Stefik et al. | 395/153 |
| 5,045,880 | 9/1991 | Evanitsky et al. | 395/155 |
| 5,065,347 | 11/1991 | Pajak et al. | 395/159 |
| 5,072,412 | 12/1991 | Henderson, Jr. et al. | 395/159 |
| 5,075,673 | 12/1991 | Yanker | 340/710 |
| 5,107,443 | 4/1992 | Smith et al. | 395/158 |
| 5,140,677 | 8/1992 | Fleming et al. | 395/157 |
| 5,140,678 | 8/1992 | Torres | 395/157 |
| 5,187,776 | 2/1993 | Yanker | 395/157 |

OTHER PUBLICATIONS

Microsoft Paint User's Guide; Microsoft Corporation, Copyright 1987, pp. V–VIII.

Primary Examiner—Mark R. Powell
Assistant Examiner—Huynh Ba
Attorney, Agent, or Firm—Jonathan F. Jobe; Andrew J. Dillon

[57] ABSTRACT

A method and apparatus are disclosed for graphically accessing of multiple simultaneously active software applications within a data processing system having a video display screen having fixed dimensions. An electronic work space is established having dimensions substantially larger than the dimensions of the video display screen. Electronic representations of multiple software applications within viewports or "windows" are then disposed at selected locations within the electronic work space. A movable viewport, having effective dimensions substantially equal to the dimensions of the video display screen, is then utilized to permit the graphic presentation of selected software applications by selectively relocating the viewport within the electronic work space. In one embodiment of the present invention a miniature graphic representation of the electronic work space is provided within the video display screen and iconic representations of the various software applications and the movable viewport are utilized therein to provide an indication of the relative locations of these objects. By selecting various iconic representations of software applications, or by dragging or tracking the movable viewport, a user may selectively access desired software applications at any point within the electronic work space.

8 Claims, 3 Drawing Sheets

METHOD AND APPARATUS FOR GRAPHIC ACCESSING OF MULTIPLE SOFTWARE APPLICATIONS

This is a continuation of application Ser. No. 07/616,151, filed 20 Nov. 1990, now abandoned.

BACKGROUND OF THE INVENTION

1. Technical Field

The present invention relates in general to improved data processing systems and in particular to improved data processing systems which permit multiple software applications to be simultaneously active. Still more particularly, the present invention relates to a method and apparatus for permitting the graphic accessing of multiple software applications within a data processing system.

2. Description of the Related Art

The advent of multi-tasking personal computer systems has caused a significant increase in personal productivity in areas where such devices may be utilized. Specifically, these devices are commonly utilized in a so-called "electronic office" to permit a computer user to simultaneously utilize word processing applications, spread sheet applications, database programs, graphics programs, and others. Each of these applications is typically displayed within a separate viewport or "window," and all applications are simultaneously output active, with only the topmost window remaining input active.

A problem which exists in such systems is the inability of the display system associated with the personal computer to display more than one software application at a time in a manner which permits the contents of the application to be read by a computer operator. Typically, the windows associated with a plurality of software applications are stacked, with only the uppermost window in an input active status. If a computer operator desires to read data within an underlying window, that window must be brought to the uppermost position. This is necessary due to the fact that if two or more windows are displayed in an unencumbered manner, the data therein is generally too small to be read by a computer user utilizing a typical display device.

Numerous solutions have been proposed to this so-called "messy desk" situation. For example, one solution utilizes a three-dimensional or "exploding" cursor, which permits the cursor to be "driven" into and out of a stack of windows, rapidly rearranging the display so that an underlying window may be examined. Similarly, another solution permits selected windows to be temporarily rendered transparent, allowing underlying windows to be visually accessed without the necessity of rearranging the window stack. Finally, another solution to this problem permits the order of display of multiple windows to be automatically altered in response to the presence of a cursor within a selected window.

Each of these proposed solutions is utilized due to the inability of a computer display screen to successfully emulate an office desktop. The utilization of display sized windows which permit data to be read generally requires multiple windows to be overlapped, creating a working environment which is cumbersome to utilize when several windows are open. It should therefore be obvious that a need exists for a method and apparatus which permits multiple software applications to be graphically accessed without the necessity of stacking and unstacking multiple windows.

SUMMARY OF THE INVENTION

It is therefore one object of the present invention to provide an improved data processing system.

It is another object of the present invention to provide an improved data processing system which permits multiple software applications to be simultaneously active.

It is yet another object of the present invention to provide a method and apparatus which permits the graphic accessing of multiple software applications within a data processing system.

The foregoing objects are achieved as is now described. The method and apparatus of the present invention permit the graphic accessing of multiple simultaneously active software applications within a data processing system having a video display screen. An electronic work space is established having dimensions substantially larger than the dimensions of the video display screen. Electronic representations of multiple software applications within viewports or "windows" are then disposed at selected locations within the electronic work space. A movable viewport, having effective dimensions substantially equal to the dimensions of the video display screen, is then utilized to permit the graphic presentation of selected software applications by selectively relocating the viewport within the electronic work space. In one embodiment of the present invention a miniature graphic representation of the electronic work space is provided within the video display screen and iconic representations of the various software applications and the movable viewport are utilized therein to provide an indication of the relative locations of these objects. By selecting various iconic representations of software applications, or by dragging or tracking the movable viewport, a user may selectively access desired software applications at any point within the electronic work space.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
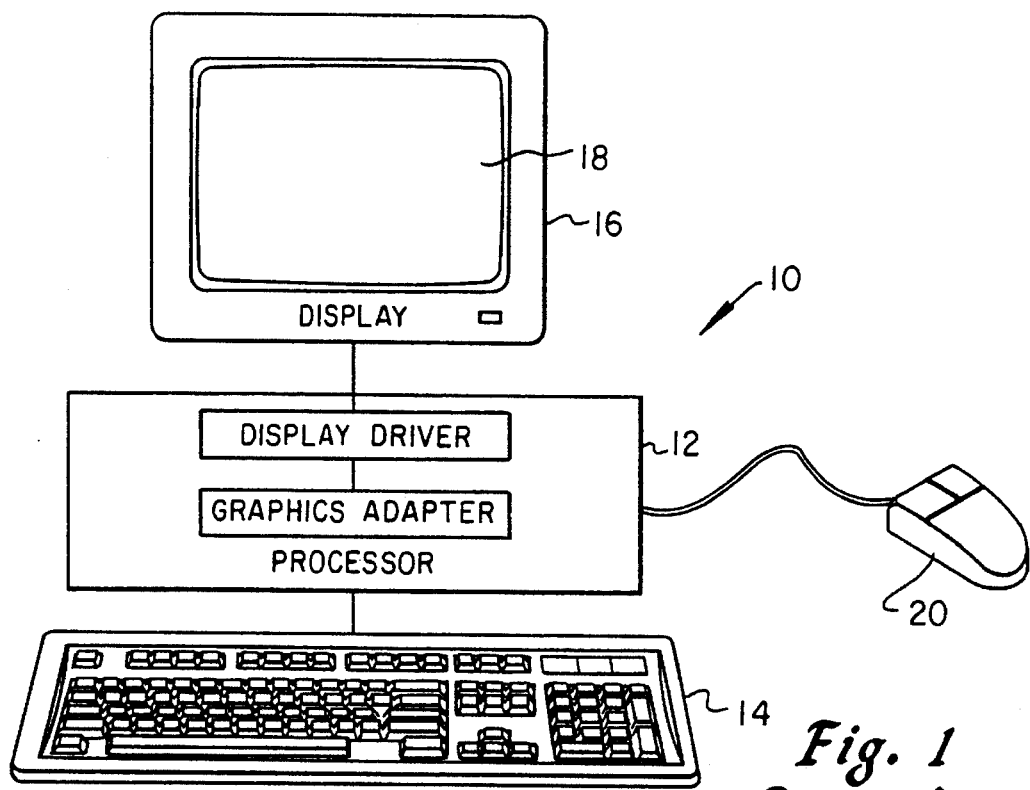
FIG. 1 is a partially schematic pictorial representation of a data processing system which may be utilized to implement the method and apparatus of the present invention.

With reference now to the figures and in particular with reference to FIG. 1, there is depicted a partially schematic pictorial representation of a data processing system 10 which may be utilized to implement the method and apparatus of the present invention. As is illustrated, data processing system 10 includes a processor 12 which is coupled to keyboard 14 and display device 16 in a manner well known in the art. Display device 16 includes a display screen 18 of fixed dimension. Those skilled in the art will appreciate that data processing system 10 may be implemented by utilizing any so-called "personal computer" which is capable of maintaining multiple simultaneously active software applications. One example of such a data processing system is the International Business Machines Corporation Personal Computer PS/2.

Disposed within processor 12 are graphics adapter 22 and display driver 24 which may be utilized, in a manner well known in the computer art, to generate the various display screens and graphic representations which are depicted in greater detail herein. Also coupled to processor 12 is graphic pointing device 20. In the depicted embodiment of the present invention, graphic pointing device 20 is implemented utilizing a mouse device and appropriate software drivers (not shown). Those skilled in the art will appreciate that alternate graphic pointing devices such as light pens or track balls may also be utilized.

Figure 2:
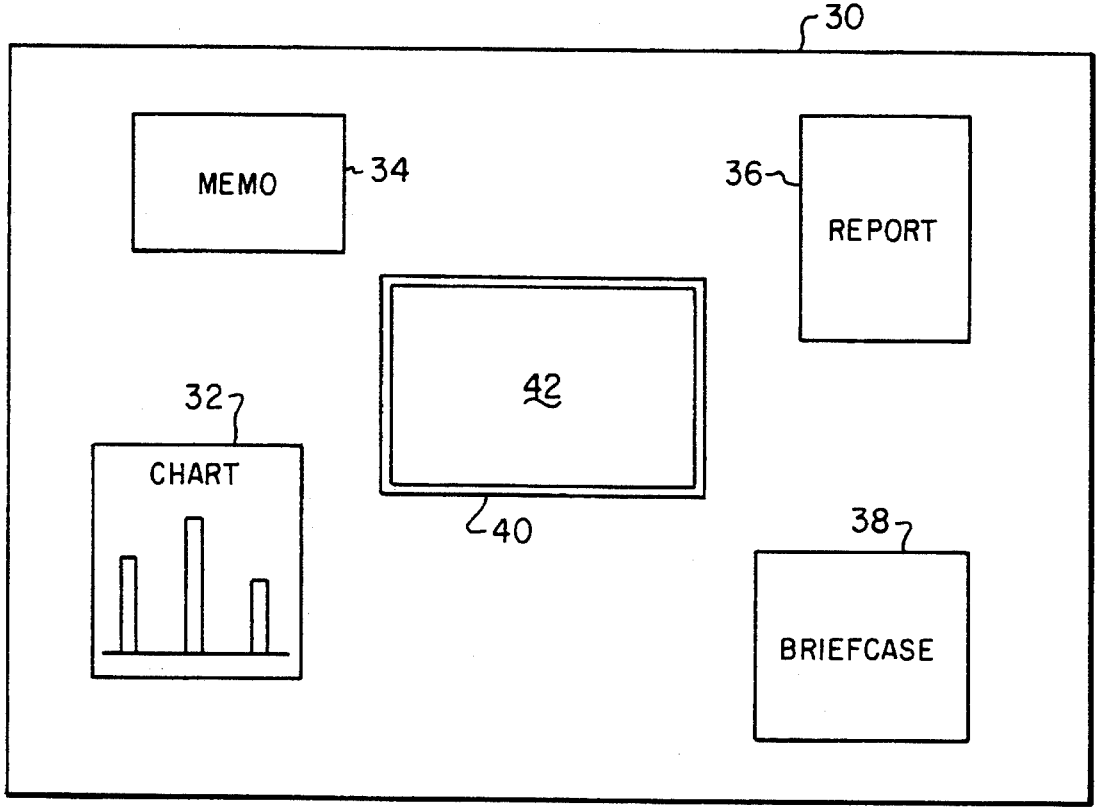
FIG. 2 is a pictorial representation of an electronic work space created in accordance with the method and apparatus of the present invention.

Referring now to FIG. 2, there is depicted a pictorial representation of an electronic work space 30 which has been created in accordance with the method and apparatus of the present invention. Electronic work space 30 is purely a conceptual entity and is created to give the user of data processing system 10 a sense of the spatial relationships between various software applications which are disposed therein. Electronic work space 30 preferably has dimensions which are substantially larger than the fixed dimensions of display screen 18; however, the size of electronic work space 30 may eventually be constrained only by memory limitations. For purposes of the method of the present invention, electronic work space 30 may be regarded as a two-dimensional surface without finite boundaries; however, the effective size of electronic work space 30 should be substantially larger than the fixed dimensions of video display screen 18.

As depicted in FIG. 2, electronic work space 30 includes electronic representations of multiple software applications. As depicted, chart application 32, memo application 34, report application 36 and briefcase application 38 are disposed at various locations within electronic work space 30. Additional work objects, such as icons representing minimized windows, devices and access to storage containers may also be graphically represented within electronic work space 30.

Briefcase application 38 is preferably a master window within electronic work space 30 and serves to make a separate work area available and current. Briefcase application 38 is preferably instantly accessible in the depicted embodiment of the present invention, regardless of its last position in electronic work space 30. A click of both buttons of graphic pointing device 20 (see FIG. 1) will cause briefcase application 38 to appear at the pointer position associated with graphic pointing device 20, overlaying, if necessary, any window which may be fully or partially visible at that location.

Briefcase application 38 preferably contains icons representing device objects, printers, telephones, waste bin and in and out baskets. Briefcase application 38 also preferably includes a filing cabinet icon which provides access to the file storage system. Other objects which are desired by the user of data processing system 10 may also be stored within briefcase application 38 to provide easy access to a group of software applications.

An important feature of the present invention is also depicted within FIG. 2. Movable viewport frame 40, which preferably has effective dimensions which are substantially equal to the fixed dimensions of display screen 18, is depicted within electronic work space 30. The contents of movable viewport frame 40, in accordance with the method and apparatus of the present invention, are coupled to display screen 18 of display device 16 to provide a full display screen sized representation of a selected portion of electronic work space 30. Thus, by selectively relocating movable viewport frame 40 within electronic work space 30 those skilled in the art will appreciate that any software application represented within electronic work space 30 may be displayed within display screen 18, without the necessity of rearranging a stack of viewports or windows.

Figure 3:
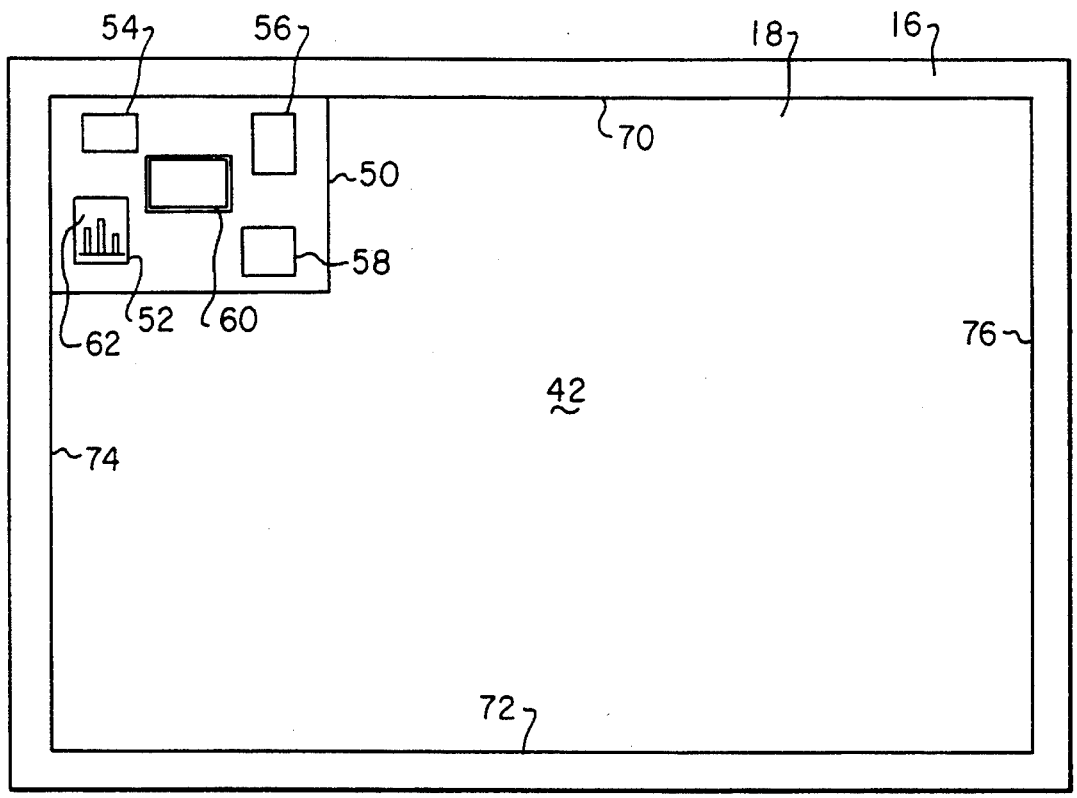
FIG. 3 is a pictorial representation of a video display screen which may be utilized to display a portion of the electronic work space of FIG. 2 in accordance with the method and apparatus of the present invention.

With reference now to FIG. 3, there is depicted a pictorial representation of video display screen 18, within display device 16, which may be utilized to display area 42, within movable viewport frame 40, of electronic work space 30. In accordance with an important feature of the present invention, a locator window 50 is preferably provided in the upper left corner of display screen 18. Locator window preferably comprises a miniature graphic representation of electronic work space 30. Contained within locator window 50 are iconic representations of those software applications represented within electronic work space 30.

For example, chart application 32 is depicted within locator window 50 by means of chart application icon 52. Similarly, memo application 34, report application 36 and briefcase application 38 are all depicted within locator window 50 by means of memo application icon 54, report application icon 56 and briefcase application icon 58. Also depicted within locator window 50 is movable viewport frame icon 60. Thus, by referring to locator window 50 the user of data processing system 10 may have a sense of the spatial relationship of area 42 within movable viewport frame 40, with respect to the location of other software applications contained within electronic work space 30.

The relocation of movable viewport frame 40 within electronic work space 30 to provide different displays within display screen 18 may be accomplished, in accordance with the method and apparatus of the present invention, in one of three different ways. Firstly, a mouse pointer 62 associated with graphic pointing device 20 may be utilized to graphically indicate an iconic representation of a software application within electronic work space 30, in the manner depicted in FIG. 3. By "clicking" graphic pointing device 20, while mouse pointer 62 is located on chart application icon 52, the location of movable viewport frame 40 will be automatically altered to encompass chart application 32 within electronic work space 30. This result is depicted within FIG. 4, which illustrates a pictorial representation of the video display screen of FIG. 3 after movable viewport frame 40 has been relocated in the manner described above.

Movable viewport frame 40 may also be selectively relocated within electronic work space 30 by selecting movable viewport frame icon 60 within locator window 50, utilizing mouse pointer 62, and thereafter "dragging" movable viewport frame icon 60 to a selected location within locator window 50. This may be accomplished in a manner well known to those skilled in the graphic pointing device art. Finally, area 42 within movable viewport frame 40 may be altered by "tracking" movable viewport frame 40 in a selected direction within electronic work space 30. This is preferably accomplished by utilizing mouse pointer 62 and placing mouse pointer 62 at an edge of display screen 18. When a "tracking" mode is enabled placing mouse pointer 62 at top edge 70 of display screen 18 will cause movable viewport frame 40 to track upward within electronic work space 30.

Similarly, placing mouse pointer 62 at bottom edge 72 of display screen 18 will cause movable viewport frame 40 to track downward within electronic work space 30. Of course, by placing mouse pointer 62 at left edge 74 or right edge 76 of display screen 18, movable viewport frame 40 may be caused to track leftward or rightward as desired. Those skilled in the art will appreciate that movable viewport frame icon 60 will preferably move a corresponding distance within locator window 50, to indicate the relative position of movable viewport frame 40 within electronic work space 30.

Figure 4:
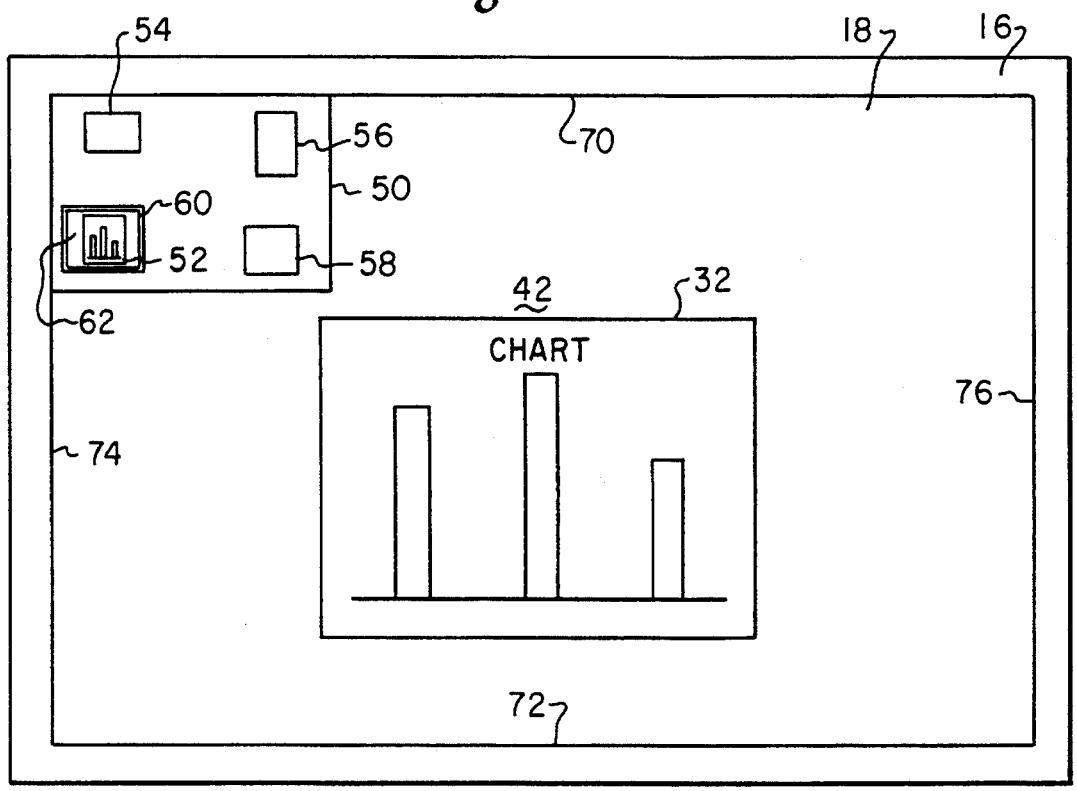
FIG. 4 is a pictorial representation of the video display screen of FIG. 3 displaying a second portion of the electronic work space of FIG. 2 in accordance with the method and apparatus of the present invention.

This is illustrated in FIG. 4, wherein movable viewport frame 40 has been relocated to the location proximate to chart application 32. As is illustrated, chart application 32 is now graphically depicted within display screen 18. Also, movable viewport frame icon 60 is now depicted within locator window 50 in a location which surrounds chart application icon 52.

Thus, those skilled in the art will appreciate that by establishing an electronic work space having dimensions substantially larger than the fixed dimensions of display screen 18 and thereafter disposing multiple software applications at various locations within electronic work space 30, those applications may be efficiently and rapidly accessed in a graphic manner by utilizing the movable viewport frame of the present invention. Further, the provision of locator window 50 within display screen 18 permits the user of data processing system 10 to retain a sense of the spatial relationships between multiple software applications in a manner which is much less cumbersome and confusing than the stacked window approach utilized in the prior art.

Figure 5:
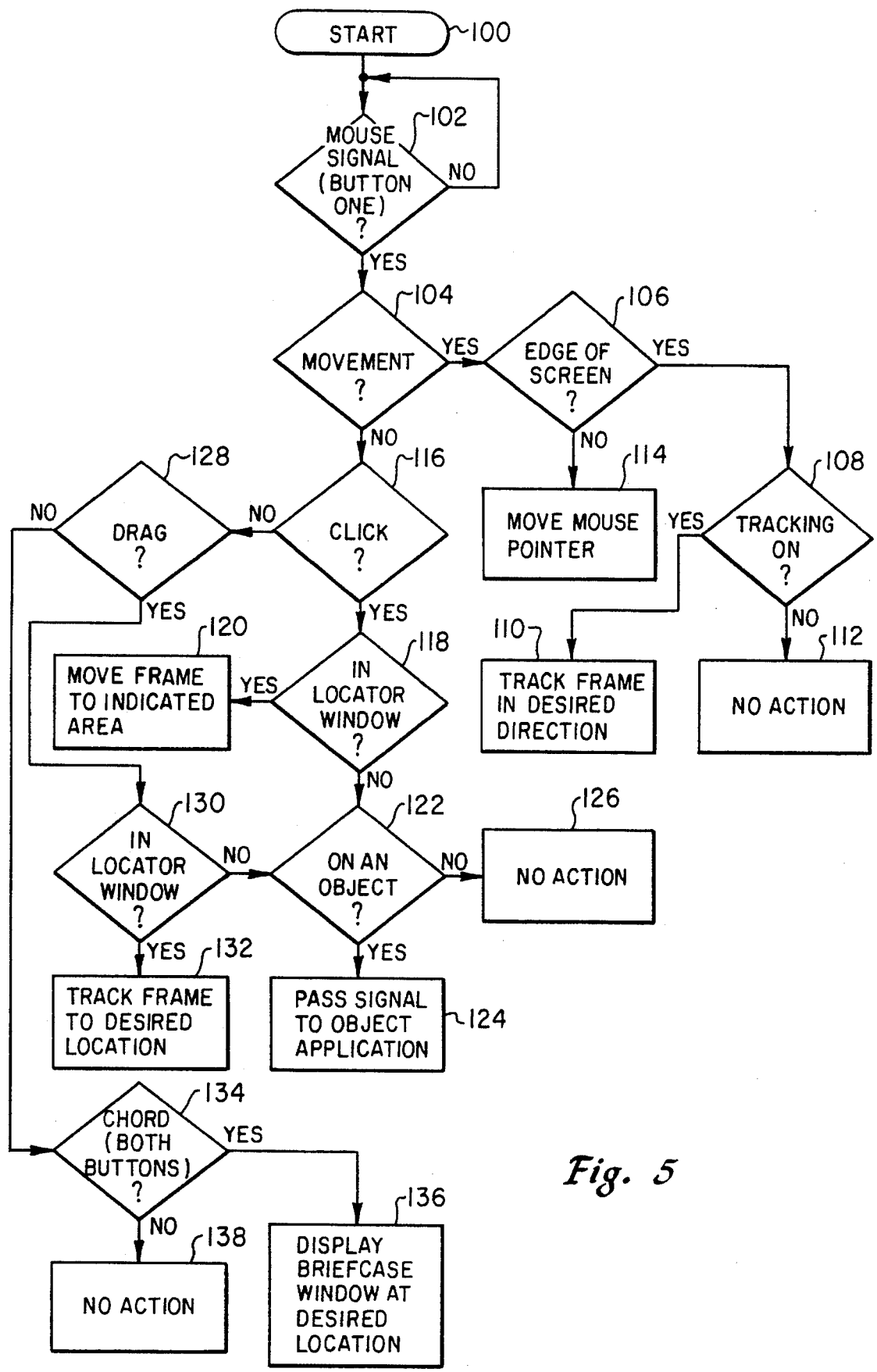
FIG. 5 is a high level logic flow chart illustrating the method of the present invention.

With reference now to FIG. 5, there is depicted a high level flow chart which illustrates the method of the present invention. The process begins at block 100 and thereafter passes to block 102 which illustrates a determination of whether or not a mouse signal has been detected. By "mouse signal" what is meant is any appropriate signal from a graphic pointing device. If no mouse signal has been detected, the process merely iterates until such time as a mouse signal has been detected.

Next, after detecting a mouse signal, the process passes to block 104 which illustrates a determination of whether or not movement of mouse pointer 62 (see FIG. 3) is associated with the mouse signal. If so, the process passes to block 106 which depicts a determination of whether or not the movement has placed mouse pointer 62 at the edge of display screen 18. If mouse pointer 62 is located at the edge of display screen 18, as determined in block 106, then the process passes to block 108. Block 108 illustrates a determination of whether or not the tracking feature described above is enabled at the present time. If so, the process passes to block 110 which illustrates the tracking of movable viewport frame 40 in a desired direction, in the manner described above. Referring again to block 108, in the event the tracking mode is not enabled, the process passes to block 112 which illustrates that no action occurs.

Referring again to block 106, in the event the mouse movement is not located at the edge of display screen 18, as determined therein, then the process passes to block 114 which depicts the moving of mouse pointer 62 to a selected location within display screen 18, as determined by the operator's movements of graphic pointing device 20 (see FIG. 1).

Referring again to block 104, in the event no movement is associated with the mouse signal detected in block 102, then the process passes to block 116. Block 116 illustrates a determination of whether or not the operator of the graphic pointing device has initiated a "click" or a rapid depression of a button of graphic pointing device 20, in a manner well known in the art. If a "click" is depicted, the process passes to block 118.

Block 118 illustrates a determination of whether or not the "click" detected has occurred while mouse pointer 62 is within locator window 50. If so, the process passes to block 120 which depicts the moving of movable viewport frame 40 to the area indicated by mouse pointer 62 when the "click" occurred.

Referring again to block 118, in the event the "click" of a button of graphic pointing device 20 has occurred while mouse pointer 62 is disposed at a location which is not within locator window 50, the process passes to block 122. Block 122 illustrates a determination of whether or not mouse pointer 62 is on an object within display screen 18. If so, the process passes to block 124 which illustrates the passing of the mouse signal to the object application. Those skilled in the art will appreciate that this is necessary to ensure that software applications which rely upon mouse signals to operate may be operated correctly in a system which utilizes the method and apparatus of the present invention. Referring again to block 122, in the event a "click" of a button of graphic pointing device 20 has not occurred while mouse pointer 62 is on an object, the process passes to block 126, which illustrates that no action occurs.

Referring again to block 116, in the event the mouse signal detected is not a "click," the process passes to block 128. Block 128 illustrates a determination of whether or not the mouse signal detected is a "drag" signal. Those skilled in the art will appreciate that an object, icon or other element within a display may be "dragged" by depressing and holding a button while moving the graphic pointing device in a manner well known in this art. If the mouse signal detected is a "drag" signal, as determined in block 128 the process passes to block 130. Block 130 illustrates a determination of whether or not the "drag" signal has occurred within locator window 50. If not, the process passes again to block 122. Block 122 illustrates a determination of whether or not the "drag" signal is directed to an object within display screen 18. If so, block 124 illustrates the passing of that signal to the object application to permit the object within display screen 18 to be relocated, in a manner well known in the art. If not, the process again passes to block 126 which depicts no action taking place.

Referring again to block 130, in the event the "drag" signal has occurred on movable viewport frame icon 60, within locator window 50, the process passes to block 132 which illustrates the tracking of movable viewport frame 40 to a desired location in the manner described above.

Referring again to block 128, in the event the mouse signal detected is not a "drag" signal, the process passes to block 134. Block 134 illustrates a determination of whether or not the mouse signal detected is a "chord" signal, typically indicating both buttons of graphic pointing device 20 have been depressed. In accordance an important feature of the present invention, the presence of the "chord" mouse signal causes the process to pass to block 136 which illustrates the displaying of briefcase application 38 at the desired location indicated by mouse pointer 62. In this manner, briefcase application 38 may be "opened" and utilized at any location within electronic work space 30. Referring again to block 134, in the event the mouse signal detected is not a "chord" signal, the process passes to block 138 and no action is taken.

Upon reference to the foregoing, those skilled in the art will appreciate that the Applicant in the present application has provided a novel and unobvious method whereby multiple software applications which are simultaneously active may be displayed in a nonoverlapped manner and efficiently and accurately graphically accessed by utilizing the method and apparatus of the present invention. Of course, those skilled in the art will appreciate that software applications within electronic work space 30 may be overlapped, if desired by the user of data processing system 10; however, due to the large area which is available within electronic work space 30 such overlapping is not necessary.

While the invention has been particularly shown and described with reference to a preferred embodiment, it will be understood by those skilled in the art that various changes in form and detail may be made therein without departing from the spirit and scope of the invention.

I claim:

1. A method in a data processing system having a video display screen of fixed dimension, a graphic pointing device and a plurality of software applications simultaneously active for permitting a user to selectively access individual ones of said plurality of software applications, said method comprising the steps of:

establishing an electronic work space having dimensions substantially larger than said fixed dimensions of said video display screen;

disposing electronic representations of said plurality of software applications at selected locations within said electronic work space;

providing a movable viewport within said video display screen having dimensions substantially equal to said fixed dimensions of said video display screen;

providing a miniature graphic representation of substantially all of said electronic work space within said video display screen, said miniature graphic representation of substantially all of said electronic workspace including iconic representations of each of said plurality of software applications;

identifying a selected area within said electronic work space utilizing said graphic pointing device within said miniature graphic representation of substantially all of said electronic work space;

relocating said movable viewport to encompass said selected area within said electronic work space in response to said identifying of said selected area; and displaying said selected area within said video display screen wherein selected ones of said plurality of software applications are selectively accessed.

2. The method in a data processing system having a video display screen of fixed dimension and a plurality of software applications simultaneously active for permitting a user to selectively access individual ones of said plurality of software applications according to claim 1, further including the step of providing an iconic representation of said movable viewport within said miniature graphic representation of said electronic work space.

3. The method in a data processing system having a video display screen of fixed dimension and a plurality of software applications simultaneously active for permitting a user to selectively access individual ones of said plurality of software applications according to claim 2, wherein said step of selectively relocating said movable viewport within said electronic work space comprises the step of graphically designating and dragging said iconic representation of said movable viewport to encompass a selected area within said miniature graphic representation of said electronic work space utilizing said graphic pointing device.

4. The method in a data processing system having a video display screen of fixed dimension and a plurality of software applications simultaneously active for permitting a user to selectively access individual ones of said plurality of software applications according to claim 3, further including the step of automatically relocating said movable viewport to encompass an area within said electronic work space corresponding to said selected area within said miniature graphic representation of said electronic work space in response to said graphic designation and dragging of said iconic representation of said movable viewport.

5. The method in a data processing system having a video display screen of fixed dimension and a plurality of software applications simultaneously active for permitting a user to selectively access individual ones of said plurality of software applications according to claim 1, wherein said step of selectively relocating said movable view port within said electronic work space comprises the step of selectively moving said movable viewport in a direction within said electronic work space indicated by a graphic designation of an edge of said movable viewport utilizing said graphic pointing device.

6. A data processing system for accessing a plurality of software applications which are simultaneously active, said data processing system comprising:

a video display screen having fixed dimensions;

an electronic work space within said data processing system having dimensions substantially larger than said fixed dimension of said video display screen;

processor means coupled to said video display for generating an electronic representation of each of said plurality of software applications at selected locations within said electronic work space;

graphic pointing means coupled to said processor means for graphically designating in area within said video display screen:

graphic control means coupled to said processor means for generating a movable viewport within said video display screen having dimensions substantially equal to said fixed dimensions of said video display screen;

display means coupled to said processor means for providing a miniature graphic representation of substantially all of said electronic work space within said video display screen, said miniature graphic representation including iconic representations of each of said plurality of software applications, wherein a selected area within said electronic workspace may be identified utilizing said graphic pointing means within said miniature graphic representation of substantially all of said electronic work space;

position control means coupled to said processor means for relocating said movable viewport to encompass said selected area within said electronic work space in response to said identifying of said selected area; and display control means coupled to said processor means for displaying said selected area within said video display screen wherein selected ones of said plurality of software applications are displayed within said video display screen.

7. The data processing system for accessing a plurality of software applications which are simultaneously active according to claim 6, wherein said graphic control means also includes means for generating an iconic representation of said movable viewport within said miniature graphic representation of said electronic work space.

8. The data processing system for accessing a plurality of software applications which are simultaneously active according to claim 7, wherein said position control means further includes means for relocating said movable viewport to encompass a selected area within said electronic workspace in response to a graphic designation and dragging of said iconic representation of said movable viewport to encompass a selected area within said miniature graphic representation of said electronic workspace.

* * * * *